May 5, 1936.  C. H. PARMELEE  2,039,445
TUNNEL KILN
Filed April 20, 1935  3 Sheets-Sheet 1
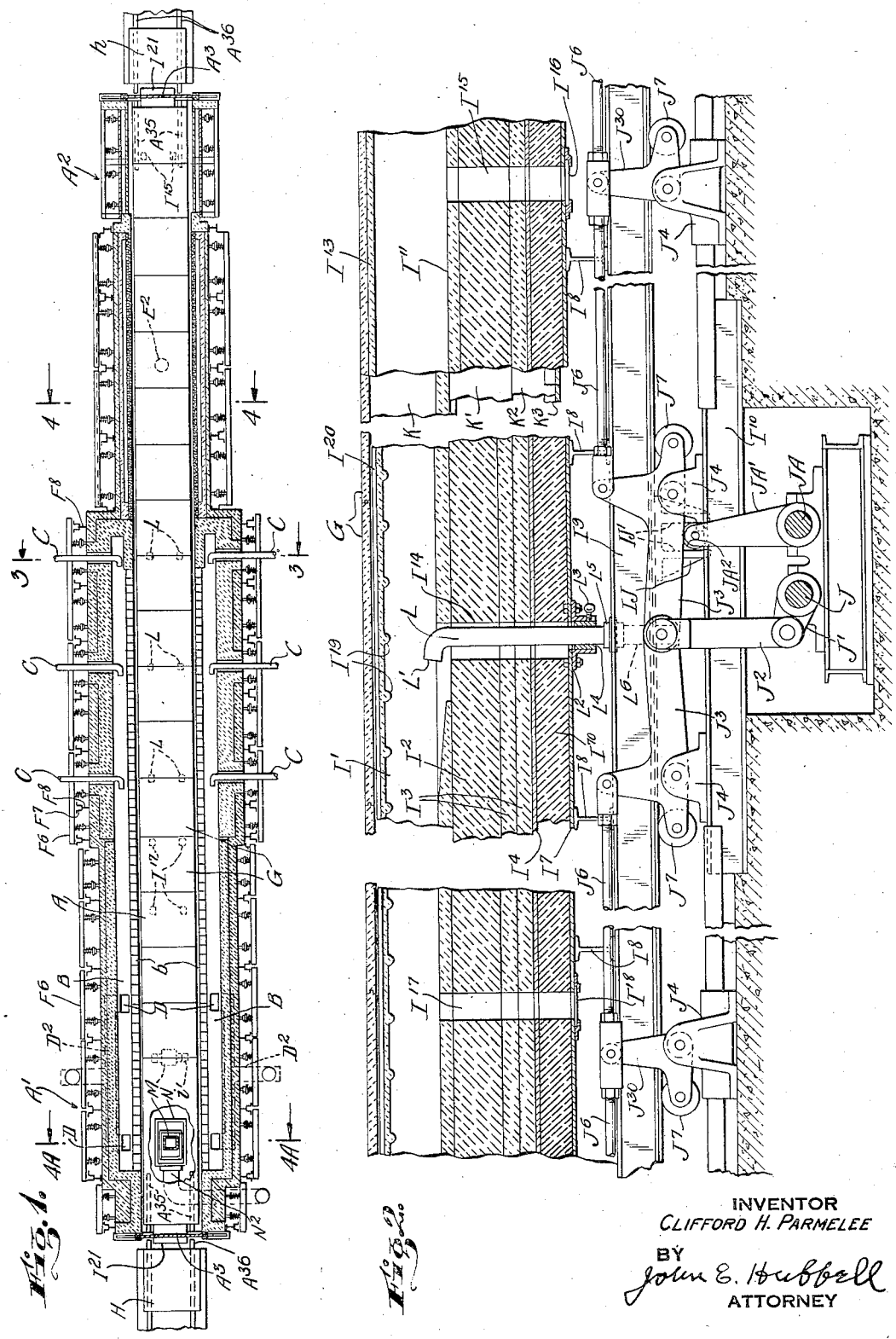
INVENTOR
CLIFFORD H. PARMELEE
BY
John E. Hubbell
ATTORNEY

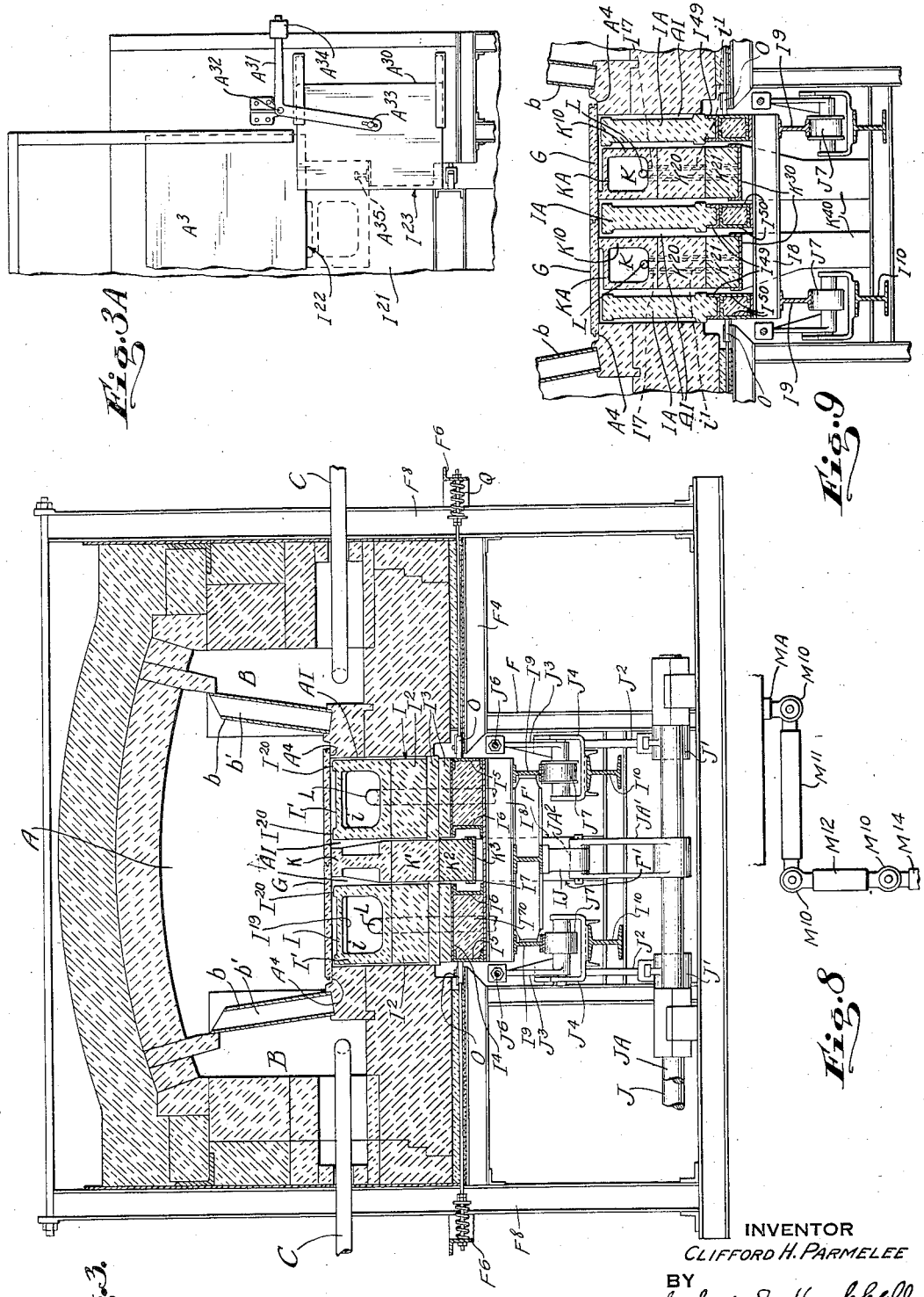

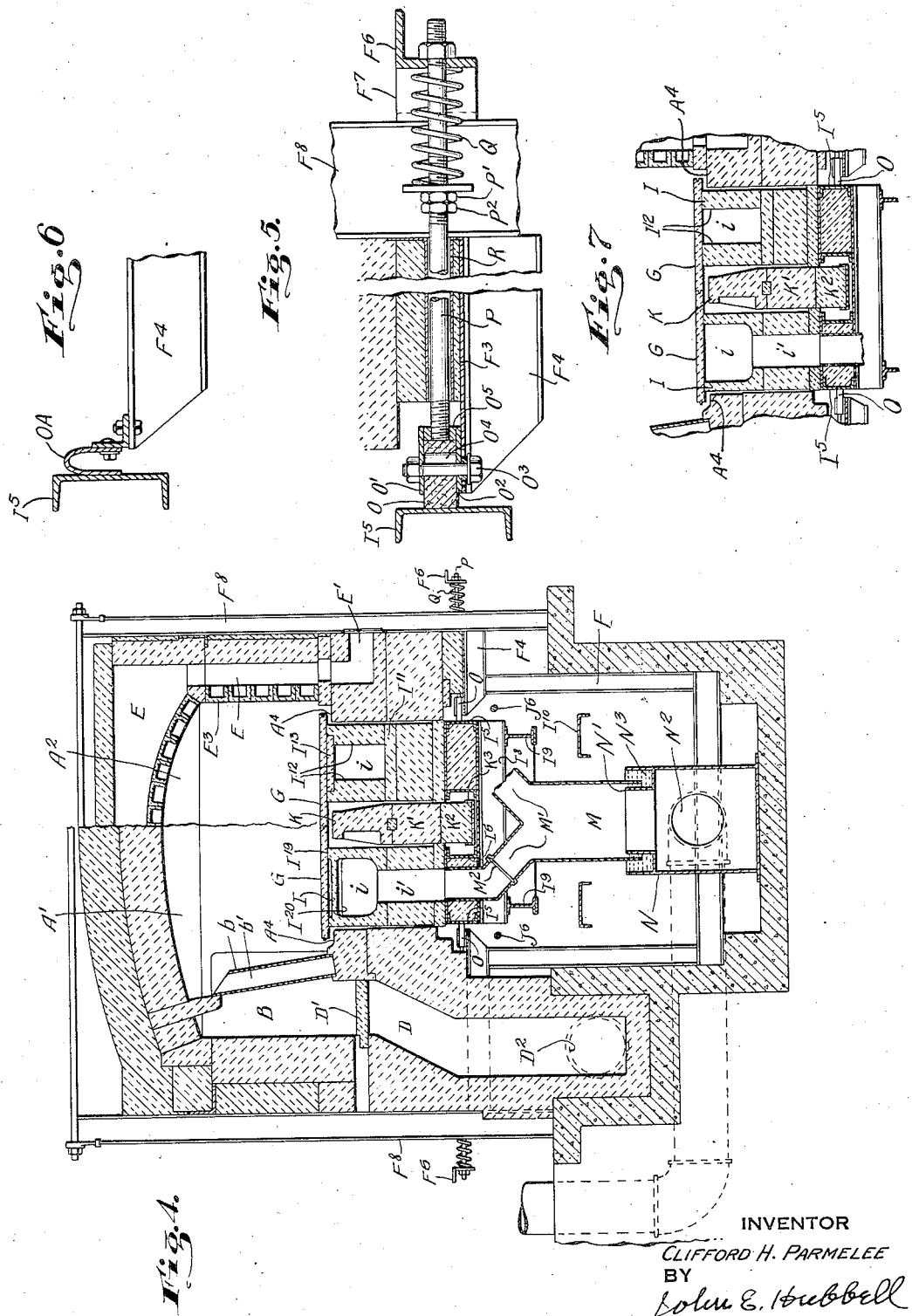

Patented May 5, 1936

2,039,445

UNITED STATES PATENT OFFICE 2,039,445

TUNNEL KILN

Clifford H. Parmelee, Syracuse, N. Y., assignor to Onondaga Pottery Company, Syracuse, N. Y., a corporation of New York Application April 20, 1935, Serial No. 17,420

20 Claims. (Cl. 25—142)

The general object of the present invention is to provide a tunnel kiln having certain novel characteristics especially adapting the kiln for use in glazing, or glost firing, tableware and analogous ceramic articles, which are not enclosed in saggers but are freely exposed to contact with the kiln atmosphere during their passage through the kiln chamber.

For such a glazing operation, it is in general essential that the atmosphere enveloping the articles being glazed, be suitably charged with vapors of the volatile ingredients of the glaze coating on the articles, and that the atmosphere be quiescent and free from contamination. In glazing tableware and analogous ceramic articles, the glazed coating applied to the articles ordinarily includes one or more substances such as lead, boron, and various alkalies, which at the glazing temperature will volatilize out of the coating to an objectionable extent, unless the enveloping atmosphere is substantially saturated with vapors of such volatile glaze constituents. In other words, the partial pressures of the volatile glaze constituents should be such large fractions of their equilibrium pressures, that there will be no appreciable net loss of volatile constituents from the glaze coating to the enveloping atmosphere.

In glazing articles enclosed in saggers, particularly when internally precoated with the glaze material, as is usual, there is ordinarily not difficulty in maintaining a sagger enclosed atmosphere which is quiescent, free from contamination by objectionable constituents, and properly charged with vapors of volatile glaze constituents. In attempting an open kiln glost firing operation, very different conditions are experienced. It is not practically feasible to maintain a kiln atmosphere containing the proper amounts of glaze constituent vapors in all portions of a tunnel kiln chamber wherein the temperature varies from 2100° F. or so in the high temperature portion of the kiln, down to temperatures much closer to atmospheric temperatures at the ends of the kiln chamber. In the low temperature portions of the kiln, the glaze vapor constituents of the atmosphere will necessarily be much smaller in amount than are required in the high temperature portion of the kiln in which the glaze is actually produced. Any general circulation of the kiln atmosphere must tend, therefore, to a changing, and unsuitable, composition of the atmosphere in contact with the articles while the glaze is being produced thereon.

The maintenance of the desired atmospheric conditions in a tunnel kiln chamber imposes special requirements on the kiln heating provisions. The kiln cannot be an open fired kiln because of the contaminating effects of the burning gases and products of combustion. The convection current circulation ordinarily relied upon in a muffle heated kiln as an important factor in obtaining heat equalization or uniformity of temperature at all points in the kiln chamber in any plane transverse to the length of the kiln, particularly in the high temperature portion of the latter, must be substantially eliminated, although approximation to such heating uniformity is essential to the glost firing operation.

In accordance with the present invention, the kiln heating requirements are met by providing muffle heating provisions at the sides of the kiln chamber, which advantageously is of a vertical depth appreciably smaller in comparison with its width than is customary to minimize the tendency to convection circulation, and by special provisions for heating the movable kiln hearth. The kiln hearth heating effect provided in accordance with the present invention supplies a substantial portion of the total amount of heat required, and in particular it supplies an adequate amount of heat to such of the goods treated as are located relatively low in the kiln chamber and adjacent the longitudinal vertical central plane of the kiln, where the heating due to the side heating provisions is least effective.

While various arrangement for supplying heat to the car bodies or other movable hearth elements of tunnel kilns have been proposed, and some of them have been used, all such arrangements, which have been found to have practical value for other kiln uses, are unsuitable for use in open glost firing, because their use involves heating gas leakage into the kiln chamber. In accordance with the present invention, I form the kiln hearth of relatively thin plate or slab sections of refractory material of relatively good heat conductivity, and progressively advance the hearth sections, with the goods which they support, through the kiln from its entrance and to its exit end, by means of one or more hearth supporting and advancing members which are given reciprocating movements, and are commonly and aptly referred to as walking beams. While tunnel kilns having hearth advancing means of the walking beam type have long been known, my improved kiln differs from all such kilns heretofore known, in the provisions which I have devised for supplying heat to the undersides of the hearth plates.

In one preferred form of the present invention, each walking beam, which extends longitudinally of the kiln chamber for the full length of the latter, and is given up and down movements as well as longitudinal to and fro movements in advancing the hearth sections of the kiln, is adapted to serve as an effective kiln hearth muffle heating unit. To this end, the walking beam is formed with a hollow upper portion which serves as a combustion chamber effectively sealed from the kiln chamber, and has associated therewith, means for supplying fluid fuel and air for its combustion to said combustion chamber in the high temperature portion of the kiln, and for withdrawing products of combustion from said combustion chamber, at one or more points adjacent the entrance end of the kiln.

In a preferred form of construction, the upper portion of each walking beam underlying the cooling zone or section of the kiln, forms the shell or wall of a flue effectively sealed from the kiln chamber, and serving as a conduit for the flow of air which assists in the ware cooling action, and is thereby heated, and after being thus heated, passes into, and serves as combustion air in, the combustion chamber portion of the walking beam. In some cases, however, the walking beam flue which serves as an air cooling flue in one longitudinal section, and as a combustion chamber in another longitudinal section of the kiln, may be open at its upper side, the kiln hearth plates then serving to seal the flue from the kiln chamber.

In lieu of forming the combustion chambers and their flue extensions in the movable walking beam or beams of the kiln, in some cases, I may form the combustion chambers in stationary portions of the kiln bottoms. Thus, for example, when the kiln is of such width as to make it desirable to employ two or more walking beams, the kiln bottom necessarily comprises a stationary portion between each two adjacent walking beams, and a combustion chamber forming flue may be provided in the upper portion of each of such stationary portions.

While the kiln construction illustrated was primarily devised, and is especially adapted, for use in a kiln for glaze firing ceramic wares, the present invention may be used in kilns for other purposes, as for bright annealing, nitriding, carburizing with gas, or other metallurgical operations requiring close control of the atmospheric composition, and the same general sort of temperature uniformity required in a glost kiln.

Aside from the general features mentioned, my improved kiln comprises various novel and practically important features of construction and arrangement hereinafter referred to. The various features of novelty which characterize my invention are pointed out with particularity in the claims annexed to and forming a part of this specification. For a better understanding of the invention, however, its advantages, and specific objects attained with it, reference should be had to the accompanying drawings and descriptive matter in which I have illustrated and described preferred embodiments of the invention.

Of the drawings:

Fig. 1 is a horizontal section through a tunnel kiln;

Fig. 2 is a longitudinal vertical section through longitudinally displaced portions or sections of one of the walking beams of the kiln shown in Fig. 1;

Fig. 3 is a transverse vertical section through the kiln, on the line 3—3 of Fig. 1;

Fig. 3A is a partial end elevation of the kiln;

Fig. 4 is a transverse vertical section through the kiln, the right hand portion of the section being taken on the line 4—4, and the left hand portion on the line 4A—4A of Fig. 1;

Fig. 5 is an enlarged view of walking beam sealing provisions shown in Figs. 3 and 4;

Fig. 6 is a partial section, taken similarly to Fig. 5 and illustrating a modified form of walking beam sealing provisions;

Fig. 7 is a partial transverse section, taken similarly to Fig. 4 and illustrating a modified form of walking beam combustion chamber construction;

Fig. 8 is an elevation illustrating a modified form of flexible conduit connection to a walking beam combustion chamber; and Fig. 9 is a transverse section taken similarly to Fig. 3 and illustrating a kiln construction in which the combustion chambers are formed in stationary kiln bottom beams alternating with the walking beams of the kiln.

In the particular embodiment of the invention illustrated in Figs. 1–5 of the drawings, the goods treated are successively introduced into the horizontally elongated kiln chamber A, at its entrance end A' and are then progressively and intermittently advanced through the kiln chamber to its exit end $A^2$, at which the goods are withdrawn from the kiln chamber. In the normal operation of the kiln, the portion of the kiln adjacent its entrance end A' serves as a preheating zone, the portion adjacent its delivery end $A^2$ serves as a cooling zone, and the intermediate portion of the kiln serves as a furnace, or high temperature, zone.

The kiln chamber side heating provisions comprise a combustion chamber B at each side of the kiln chamber. Each heating chamber B extends from a point adjacent the entrance end $A^1$ of the kiln to the remote end of the high temperature zone of the kiln. Fuel burners C enter the chambers B at points suitably distributed along the furnace or high temperature zone of the kiln, and products of combustion are withdrawn from the chambers B, at one or more points adjacent the inlet end of the kiln, through outlets D, provided with regulating dampers D' and communicating with an off-take connection $D^2$ leading to a stack or exhaust fan. Combustion air may be supplied to the combustion chambers B in any usual manner, not illustrated, and ordinarily is air preheated in the kiln cooling zone or section of the kiln. The latter, as shown, comprises a kiln chamber roof and side wall space E into which air is admitted through inlets E', and from which air is withdrawn through one or more top outlets $E^2$ in suitable amounts. Advantageously, the wall $E^3$ between the space E and the kiln chamber is formed of good heat conducting material, which may be metal, in the exit end portion of the zone, but nearer the high temperature zone the wall is preferably formed, as shown in Fig. 4, of thin walled blocks of ceramic material of good heat conductivity, such as silicon carbide or sillimanite.

As shown, the wall between each combustion chamber B and the kiln chamber A, is formed in whole or in part, of hollow tile members $b$ with uprising channels $b'$ open at their upper ends to the kiln chamber, but not at their lower ends so that they do not contribute to the directed convection current circulation of the kiln atmosphere obtained in prior muffle heated kilns in which such combustion chamber wall channels are open both at their lower and upper ends to the kiln chamber. As shown, the kiln masonry is supported on and by a steel framework F, whereby access is provided to the under-side of the kiln structure for the entire length of the kiln except at points adjacent the heating gas off-take connections.

The movable kiln hearth on which goods treated in the kiln are supported and progressively advanced through the kiln chamber, is shown as formed of rectangular plates or sections G, of refractory material, of relatively good heat conductivity, such as silicon carbide or sillimanite. As shown, the different hearth plate sections G are similar in form, and are arranged in two side by side rows, and have their edges shaped to provide tongue and groove joints between the end-to-end sections in each row, and between the side by side sections in the two rows. The plate G may be successively introduced into the kiln at its inlet end with the goods to be treated stacked thereon, and may be successively removed as they come to the delivery end of the kiln with the goods treated still mounted thereon. To facilitate the introduction of the goods and hearth plates G, a charging buggy H is provided at the entrance end of the kiln, and a discharging or delivery buggy $h$ is provided at the opposite end of the kiln to handle the goods and hearth plates removed from the kiln at that end, but the form and construction of those buggies, and the form and construction of the hereinafter described means including the kiln doors $A^3$ for sealing the ends of the kiln, constitute no part of my invention claimed herein.

The hearth sections G are intermittently advanced longitudinally of the kiln, by hearth advancing mechanism comprising a movable walking beam I beneath each longitudinal row of sections G, and extending for the full length of the kiln. The two beams I are rigidly connected and are given reciprocating movements so related to the longitudinal movements that the beams are in an elevated goods supporting position as shown in Fig. 4, when moving longitudinally of the kiln in the direction of goods travel from the inlet end of the kiln to the delivery end, and are lowered out of supporting relation with the goods as shown in Fig. 3, while moving from the delivery end of the kiln toward the inlet. During each last mentioned movement the walking beams I are below the kiln hearth sections G, which are then supported on a stationary goods supporting surface of the kilns structure shown as comprising portions at the outer sides of the two beams I and a portion between the two beams. Thus, as shown, each section G then has its outer side edge resting on and supported by the top surface of a stationary kiln bench or ledge portion $A^4$ at the corresponding side of the kiln chamber, and has its inner edge supported by the top surface of a stationary beam-like portion K of the kiln structure.

The stationary beam K extends longitudinally of the kiln for the full length of the latter along the kiln center line, and has its upper surface at the level of the hearth supporting surfaces of the ledges $A^4$. In the construction shown, the upper portion of the stationary beam K is formed by refractory ceramic blocks which rest upon a subjacent beam section $K^1$, which may be formed of ordinary fire bricks, and supported in turn on a subjacent section $K^2$ of insulating bricks. The section $K^2$ rests in turn upon a channel bar $K^3$ supported at intervals along its length by columns or posts $F''$ forming a part of the kiln steel substructure F. The beam K thus constitutes a part of the bottom wall of the kiln chamber which is formed with a kerf or slot AI at each side of the beam K receiving the corresponding walking beam I.

In the high temperature portion of the kiln, each of the movable beams I comprises an upper portion formed of hollow blocks $I'$ of highly refractory ceramic material arranged end to end and forming the wall of a flue or channel $i$ extending longitudinally of the kiln. As shown, those blocks rest upon a subjacent beam section $I^2$ which may be formed of fire brick, and the section $I^2$ rests in turn upon insulating bricks $I^3$ arranged in two courses. The lower course of bricks $I^3$ rest upon a metal plate $I^4$. The latter is supported by two longitudinal metal beams or bars $I^5$ and $I^6$ one adjacent each side of the walking beam, and shown as each of channel bar cross section. Each of the beams $I^5$ and $I^6$ extends longitudinally of the kiln for the full length of the walking beam. The space between the beams $I^5$ and $I^6$ of each beam I is advantageously closed at its bottom by a metal plate $I^7$ and packed with heat insulating material $I^{70}$ which may well be Silocel. The channel bars $I^5$ and $I^6$ of both walking beams are supported upon the same suitably spaced transverse I-beams $I^8$. The transverse beams $I^8$ are supported adjacent their ends on longitudinal beams $I^9$. The beams $I^8$ and $I^9$ thus form a rigid metallic supporting structure for both walking beams, and are engaged and moved by the beam operating mechanism which may be of any usual or suitable type.

As shown, the means for giving the walking beam structure its movements, comprise a shaft J which gives the structure its up and down movements, and a shaft JA which gives the structure its longitudinal to and fro movements. The shafts J and JA are arranged side by side at any convenient intermediate point along the length of the kiln, and extend transversely to the latter beneath the kiln masonry. Through a crank arm $J'$ and link $J^2$ a each side of the kiln, rotative movements of the shaft J give oscillating movements to four levers $J^3$ arranged in two pairs, one pair being at each side of the kiln and comprising two levers at opposite sides of the shaft J. The levers $J^3$ are journalled in brackets $J^4$ mounted on stationary beams $I^{10}$ directly beneath the main supporting beams $I^9$ of the walking beam structure. Through a connecting rod $J^6$, the oscillating movements of each lever $J^3$ gives similar oscillating movements to bell crank levers $J^{30}$ located at suitably frequent intervals along the length of the kiln between that lever $J^3$ and the end of the kiln at the opposite side of the latter from the shaft J. Each of the levers $J^{30}$ is journalled in an individual bracket $J^4$ mounted on the corresponding beam $I^{10}$.

Each of the levers $J^3$ and $J^{30}$ has an arm in which a roller $J^7$ is journalled to turn about a horizontal axis transverse to the length of the kiln. The various rollers $J^7$ are given simultaneous up and down movements by the rotative movements of the shaft J and provide movable supports for the walking beam structure, which has its main supporting beams $I^9$ resting on the rollers $J^7$ at all times. The shaft JA carries an arm $JA'$ beneath the center of the kiln, and carrying an anti-friction roller $JA^2$ at its upper end, which works in a vertical guideway formed in a bracket IJ secured to the walking beam structure. The opposing guideway sides IJ' between which the roller JA² fits and works, are vertical. In consequence, oscillatory movements of the shaft JA give longitudinal to and fro movements to the walking beam structure supported by the rollers J⁷.

The movements of the shafts J and JA are so timed, that the movements of the walking beam structure in one direction, produced by the shaft JA, will occur with the walking beam structure raised to lift the edges of the hearth plates G off their stationary supports A⁴ and K as shown in Fig. 4, and that the movements in the opposite direction produced by the shaft JA, will occur while the walking beam structure is lowered, as shown in Fig. 3, so that the beams I do not engage the hearth plates G, which then have their edges resting upon the ledges A⁴ and beam K. Since the means for giving the shafts J and JA their movements form no part of the present invention, further reference thereto is unnecessary.

In the preheating and cooling zone sections of the kiln, the upper portion walking beam structure may be the same as in the high temperature zone of the kiln. As shown in Fig. 4, however, in the preheating zone section, where the temperatures are lower than in the high temperature zone, one course of the heat insulating bricks I³ are omitted, and the vertical depth of the beam section I² is correspondingly increased. As shown in Fig. 4, also, in the cooling zone section of the kiln, the upper walking beam portion including the corresponding portion of the flue $i$ is formed by a bottom row of slabs I¹¹, two rows of blocks I¹² which form the sides of the flue $i$, and a row of slabs I¹³ which form the top wall of the flue, and have their side edges received in rabbets or corner recesses formed in the slabs I¹².

Gaseous fuel is supplied to each combustion chamber flue $i$ by one or more burner pipes or nozzles L. As shown, one such burner pipe L enters each flue adjacent the junction of the high temperature and cooling zone section of the kiln, and two other burner pipes L enter each flue $i$ at points more remote from the cooling zone section. Each burner pipe L is advantageously formed of a highly refractory metallic alloy, and extends upwardly into the corresponding flue $i$ through a vertical passage I¹⁴ formed in the subjacent portion of the walking beam. Each burner pipe L has its upper or burner end L¹ transversely bent, and pointing toward the entrance end of the kiln, and is supported adjacent its lower end by a flange collar L² which may be bolted to the plate I⁷, a clamping screw L³ and bushing L⁴ being provided to secure the burner pipe in the collar L². Beneath the latter the burner pipe L is connected through a suitable connecting member L⁵ to a section of flexible hose L⁶, which may be connected to rigid stationary fuel supply piping (not shown), and are of such length and flexibility as to accommodate the walking beam movements.

Adjacent the entrance end of the kiln, one or more heating gas outlets $i'$ from the flues $i$ in each beam I are formed in the subjacent portion of the beam structure. As shown, each flue $i$ has two such outlets $i'$ displaced longitudinally of the kiln from one another, and each located at the same distance from the entrance end of the kiln as the corresponding outlet $i'$ from the other flue. A common gas take off connection M is provided for each of the two outlets $i'$ at the same distance from the entrance end of the kiln. Each connection M is a metal Y pipe structure having the upper ends of its branches M' telescopically received and anchored in the corresponding channels or passages $i'$, and advantageously each branch M' is provided adjacent its lower end with a regulating damper M².

The lower end of each pipe structure M telescopically surrounds an uprising tubular pipe section N' forming the inlet to a corresponding stationary metallic off-take box N connected by pipe N² to a stack or other exhausting device (not shown). The portion of the off-take member M which surrounds the tubular part N' is of sufficient vertical extent and of sufficiently large horizontal cross section to permit the occurrence of the walking beam movements, in which the member M shares, without disturbing the effectiveness of the hydraulic seal against leakage through the joint between the parts M and N', which is formed by liquid within a sealing chamber N³ provided on the member N and surrounding its tubular inlet portion N'.

At the entrance end of the kiln the flue $i$ in each walking beam is closed, except for the outlets $i'$. At the exit end of the kiln, provisions are made for the entrance of atmospheric air into the ends of the flues I. To this end each walking beam may be formed adjacent its exit end with an inlet passage I¹⁵ leading upwardly through the walking beam to the flue $i$ therein. Preferably, a separate damper I¹⁶ is mounted in the walking beam structure to regulate the inflow of air through each inlet passage I¹⁵.

To obtain the proper kiln bottom heating effect in the high temperature portion of the kiln, the volume of the heating gases in the flues $i$ may be so large and the temperature of the gases so high, as to provide too great a kiln bottom heating effect in the preheating section of the kiln, unless suitable corrective provisions are made. Those corrective provisions as shown, comprise one or more air inlet passages I¹⁷ leading upward through each walking beam I to its flue $i$, intermediate the burners L and the outlets $i'$. Through the passages I¹⁷, which are open to the atmosphere at their lower ends, atmospheric air is drawn into the flues $i$, to mix with the heating gases and suitably reduce the temperature of the mixture. The amount of air so drawn into the flues $i$ may be regulated by throttling dampers I¹⁸ for the different inlet passages I¹⁷, said dampers being mounted in the lower portion of the walking beam structure.

To increase the heat conductivity of the top walls of the flues $i$, in the high temperature section, and advantageously in the preheating section, also, of the kiln, the top walls are advantageously made as thin as conditions will permit, and as shown, are given increased strength by integral transverse ribs I¹⁹ at their under sides, which are suitably spaced along the length of the kiln.

Leakage between the kiln chamber and the atmosphere through the kiln chamber bottom wall slots AI in which the walking beams I work, may be prevented in various ways. The provisions for the purpose shown in Figs. 1–5, include a sealing member O at each side of the walking beam structure, extending longitudinally of the kiln for the full length of the latter. As shown each sealing member O is a body of suitable refractory packing material, which may be a suitably impregnated mass of asbestos fibres. The member O is clamped between upper and lower metal plates O' and O², which are connected at intervals along the length of the sealing member by clamping bolts $O^3$ which extend through opening $O^4$ in the body member. The openings $O^4$ are advantageously transversely elongated to permit of adjustment of the body member transversely of the plates $O'$ and $O^2$ toward the adjacent walking beam to compensate for sealing member wear. Each sealing member body O bears against the vertically disposed bottom or web of the corresponding channel bar beam member $I^5$, which to this end advantageously has its flanges extending toward the stationary beam K. The bottom plate $O^2$ of each sealing member is slideably mounted upon a corresponding metal plate $F^3$ supported on transverse beam portions $F^4$ of the metallic sub-structure of the kiln, so as to provide a tight joint between the sealing member and the plate $F^3$.

Each sealing member is engaged by rods P extending into the kiln from the adjacent side of the latter at suitable intervals along the length of the kiln, and spring pressed toward the sealing member to thereby hold the body portion of the latter against the adjacent beam $I^5$ with suitable pressure. As shown, the external portion of each rod P is threaded to receive an abutment nut $P'$ and an adjacent nut lock $P^2$. A helical compression spring Q surrounding the outer portion of each rod P, acts between the nut $P'$ thereon and an outer stationary abutment bar $F^6$ secured by brackets $F^7$ to the buckstay portions $F^8$ of the metallic kiln supporting structure. By adjustment of the nut $P'$ on the rod P associated with each sealing member, the tension of the corresponding springs Q may be varied as required to insure that the sealing member will engage the corresponding beam $I^5$ with the proper pressure. As shown each rod P is mounted, and fits snugly, in a pipe section R imbedded in the lower portion of the kiln masonry above the plate $F^3$. As shown, also, the inner end of each rod is threaded into a nut $O^5$ located between and advantageously welded to the corresponding sealing member plates $O'$ and $O^2$.

The above mentioned sealing members O, constructed and arranged as described, effectually prevent leakage through the joints between the outer sides of the walking beams and the adjacent side walls of the slots $A'$. Leakage into or out of the kiln chamber through the joints between the inner sides of the walking beams and the central beam K is effectually prevented by the hearth sections G, which in the elevated position of the walking beams, shown in Fig. 4, close the upper end of the space between the two walking beams, and in the lowered positions of the latter, shown in Fig. 3, close the upper ends of the two slots AI. Proper joint sealing engagement of the beam blocks $I'$ with the hearth plates G is facilitated by forming a shallow recess in the top of each block, so that the hearth plates are directly engaged by the longitudinal rib portions $I^{20}$ on the upper sides of the blocks $I'$ at the sides of said recesses.

The walking beam side sealing means employed may take other forms than that illustrated in Figs. 1–5. For example, as shown in Fig. 6, each side sealing member OA, replacing the corresponding sealing body O of the construction first described, consists of a flexible metallic plate OA extending longitudinally of the kiln. One edge of the plate OA is suitably secured or anchored to the metallic supporting structure parts $F^4$, and the plate is of sufficient width, and so shaped, as to have a side portion adjacent its other edge in resilient engagement with the outer side of the base or web portion of the corresponding beam supporting channel bar $I^5$.

In lieu of forming the walking beam combustion chambers or flues $i$, with imperforate top walls constituting rigid parts of the movable walking beams, each chamber $i$, as shown in Fig. 7, may be open at its top for its full length, since the hearth plates may effectually seal communication between the kiln chamber and the open top combustion chambers $i$ at all times. With the hearth plates supported in their elevated positions by the walking beams as shown in Fig. 7, there is a theoretical possibility for some contamination of the kiln chamber atmosphere by combustion gases passing into the kiln chamber from the joint spaces between the outer sides of the walking beams and the adjacent portions of the kiln structure, since combustion gases may enter said joint spaces during the intervals in which the walking beam structure is lowered out of contact with the hearth plates. The joint spaces may be of such small volume, however, that the maximum amount of combustion gases which can pass therefrom into the kiln chamber is so small as to be without practical significance, particularly as the lower edges of the joint spaces are sealed from the atmosphere and there can be no significant draft flow through the joint spaces. Similarly, the depletion of the desired atmosphere in the kiln chamber by a gaseous movement from the kiln chamber through the joint spaces into the combustion chambers, is effectually prevented to all practical purposes.

The use of combustion chambers open at their tops as shown in Fig. 7, simplifies and cheapens the walking beam construction somewhat, and possesses the additional advantage that the resistance to heat flow between the combustion chambers and the kiln chamber is reduced to the resistance of the hearth plates G to heat flow through the latter.

In lieu of flexible hose sections $L^6$ included in the fuel supply connections, and liquid sealed telescopic joints included in the waste gas off-take connections of the kiln, as shown in Figs. 1–5, other flexible conduit connections may be made to the walking beam combustion chambers $i$. For example, each such flexible connection may be formed of rigid pipe sections hinged or slidingly connected to permit of relative movements of the rigid parts. Thus, as shown in Fig. 8, each such flexible connection may consist of a pipe section MA rigidly connected to, and depending from the corresponding walking beam, a pipe section $M^{11}$ extending in the general longitudinal direction of the kiln and connected at one end to the pipe section MA by a hinged joint $M^{10}$, and connected at its other end by a similar hinged joint $M^{10}$ to the upper end of a short uprising pipe section $M^{13}$ which is connected by a hinged joint $M^{10}$ to a stationary pipe section $M^{14}$. With the axes of the hinged joints $M^{10}$ all horizontal and transverse to the length of the kiln, and with the pipe section $M^{11}$ and $M^{12}$ of convenient lengths, the hinge movements required to accommodate the walking beam movements are comparatively small and can be effectively taken care of with hinged pipe joints of well known form and practically free from leakage.

At each end of the kiln the movable walking beam element is provided with a fabricated metal end portion $I^{21}$ which closes the end of the space between the two walking beams I and has a machined upper surface $I^{22}$, in the plane of the upper sides of the body portions of the two walking beams, and normally engaged by the lower edge of the corresponding kiln door $A^3$. The latter is mounted in guideways to share the up and down movements of the walking beam structure, while being prevented by said guideways from sharing the longitudinal movements of the walking beams. Each of the vertical sides $I^{23}$ of each walking beam end portion $I^{20}$ is also machined, and is normally engaged by a corresponding sealing side door or shutter member $A^{30}$, which is movable horizontally toward and away from the corresponding side of the walking beam structure, and is normally pressed snugly against the surface $I^{23}$. The means shown in Fig. 3A for normally holding each door $A^{30}$ against the corresponding beam end side surface $I^{23}$ with the proper pressure, comprises a bell crank lever $A^{31}$. The latter is pivoted to the kiln structure at $A^{32}$, and has a depending slotted arm engaging a pin $A^{33}$ carried by the corresponding side door or shutter $A^{30}$, and has a horizontal arm carrying an adjustable counter-weight $A^{34}$ for urging the door into engagement with the walking beam end.

Leakage into the kiln chamber along the top and side walking beam surfaces $I^{21}$ and $I^{22}$, in engagement with the lower and inner edges, respectively, of the doors $A^3$ and $A^{30}$, is thus prevented when those doors are in their normal closed position. The kiln must be opened at its ends, of course, during the periods required for the movements of the buggies H and $h$, into and out of the kiln chamber in the kiln charging and discharging operations, but those operations may be quickly performed, and involve little interference with the maintenance of the desired kiln atmospheric conditions. As shown, the tracks on which the buggies run, include portions $A^{35}$ within the kiln chamber and separated from the aligned external portions $A^{36}$ of the tracks by gaps in the planes of the corresponding sliding doors.

As those skilled in the art will understand, each flue $i$ formed in the walking beam structure serves in conjunction with the corresponding fuel and air supply and waste heating gas off-take provisions, as a simple and effective unit for modifying and regulating the temperature in the bottom portion of the kiln. The portion of each flue $i$ between its burners L and waste heating gas outlets $i'$, forms a combustion chamber supplying heat to the bottom of the kiln chamber along the longitudinal portion of the latter at which such heat is needed, while the portion of the flue between its burners and the exit end of the kiln serves a desired kiln chamber bottom cooling purpose, and in doing so desirably preheats the air used to support combustion in the combustion chamber portion of the flue. By the use of one or more side by side flues $i$ of suitable dimensions in each walking beam structure, it is possible to obtain the required kiln bottom temperature modifying effect without undesirably weakening or complicating the walking beam structure. The air inlet throttling dampers and waste heating gas off-take dampers, mounted in the walking beam structure at or adjacent its underside, are suitably accessible for adjustment, and provide adequate regulation or control of the temperature modifying effects of the different longitudinal portions of the flue, without exposure of the throttling dampers to objectionably high temperatures.

The special joint sealing provisions including the elongated sealing members O, as well as those including the sealing members OA, are simple and effective to prevent leakage between the kiln chamber through the joints between the sides of the walking beam structure and the adjacent sides of the kiln bottom slot in which the walking beam is received and moves, notwithstanding the very considerable length of those slots. Moreover the described sealing provisions do not interfere with the use of air and fuel inlets and waste heating gas off-take outlets located wherever desirable along the length of the walking beam structure, since those inlets and outlets pass downward through the beam structure and have their lower ends below the level of the side sealing means.

As will be apparent, the kiln construction is well adapted for its special glost kiln purpose of maintaining a quiescent, uncontaminated kiln chamber atmosphere including suitable amounts of vapors of volatile glaze forming agents in contact with the goods undergoing the glaze forming process in the high temperature portion of the kiln.

As previously indicated, a desirable bottom heating effect in a walking beam type of kiln may advantageously be obtained in some cases, by means of combustion chambers which are not located in the walking beams but in adjacent stationary portions of the kiln structure. One kiln construction of this type is illustrated in Fig. 9, wherein the kiln bottom wall comprises two stationary beams KA, and the movable walking beam structure comprises three side by side walking beams IA with a stationary beam KA between each pair of walking beams IA. Each stationary beam KA thus forms one side wall of each of two of the three bottom wall slots AI in which the different beams IA are respectively received. The beams IA and KA collectively serve the same hearth plate supporting and advancing purposes, as are served by the previously described walking beams I and stationary beam K. In Fig. 9, however, the hearth plates G in the two longitudinal rows are all supported at their inner edges on the central walking beam IA, when the walking beam structure is elevated to lift the hearth plates off the stationary beams KA and side supporting surfaces $A^4$.

Advantageously, and as shown, each of the walking beams IA is of less thickness measured transversely to the length of the kiln than each of the beams KA. As shown, each beam IA is formed of refractory material which may be in the form of molded blocks resting in a channel bar $I^{49}$ and supported on the transverse movable beams $I^8$ by an interposed longitudinal beam shown as formed by two channel bars $I^{50}$ with their faces vertically disposed. Walking beam side sealing provisions may engage the outer sides of the two members $I^{50}$ at the opposite sides of the walking beam structure, as the sealing members O and OA engage the correspondingly located channel bars $I^5$ in the constructions previously described.

Each of the beams KA, may be generally similar in construction to the walking beams I of the construction previously described, and as shown, each beam KA comprises an upper section $K^{10}$ in which a combustion chamber $k$ is formed, an intermediate section $K^{20}$ of fire brick material, and a lower section $K^{21}$ of heat insulating brick material mounted in, and resting on a channel bar $K^{30}$. The latter may be mounted on, and supported by stationary beams or posts $K^{40}$, forming a part of the metallic under structure of the kiln. The combustion chamber $k$ in each beam KA may have fuel and air inlets and waste heating gas off-take provisions, similar in their disposition and functions to the corresponding provisions associated with the walking beam combustion chambers $i$, in the construction shown in Figs. 1–5. As will be apparent, however, the conduit connections to the combustion chambers $k$ in the stationary beams KA, need include no flexible portions.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The combination in a continuous tunnel kiln having a horizontally elongated chamber and a bottom wall for said chamber comprising two or more longitudinally extending portions, each separated from another of said portions by a longitudinally extending bottom wall slot and the upper side of each of which provides a stationary supporting surface, of a vertically and longitudinally reciprocating goods advancing structure including a beam portion working in each such slot, the upper side of each such beam portion forming a movable supporting surface moved between a position above and a position below said stationary surface when said structure is raised and lowered, said stationary and movable surfaces cooperating for the step by step advancement of goods through said chamber, and one or more kiln heating units, each comprising an elongated combustion chamber formed in one of said portions and horizontally intermediate of those portions of said slot or slots which are respectively adjacent to the opposite sides of the first mentioned chamber, and means for supplying fuel and air for its combustion to, and for withdrawing products of combustion from said combustion chamber.

2. A combination as specified in claim 1, in which each combustion chamber has imperforate side walls and is open at its top and in which the kiln comprises movable hearth plates advanced through the kiln by the goods advancing structure and cooperating with the latter and the longitudinal bottom wall portions of the kiln chamber to provide a seal between the last mentioned chamber and each combustion chamber, and in which the kiln comprises sealing means for preventing fluid flow into or out of the kiln chamber through the joints between the slot walls and adjacent movable beam portion side walls.

3. A combination as specified in claim 1, in which the fuel and air for its combustion are supplied to, and products of combustion are withdrawn from each combustion chamber through ports opening to the latter from the underside of the said portion in which the combustion chamber is formed.

4. A combination as specified in claim 1, in which each combustion chamber specified is formed in a beam portion of said goods advancing structure.

5. A combination as specified in claim 1, in which each combustion chamber specified is formed in a stationary bottom wall portion.

6. The combination in a continuous tunnel kiln having a horizontally elongated chamber through which goods are moved from the entrance end of said chamber to its exit end and having a bottom wall comprising two or more longitudinally extending portions, each separated from another of said portions by a longitudinally extending bottom wall slot, and the upper side of which provide a stationary supporting surface, of a vertically and longitudinally reciprocating goods advancing structure comprising a beam portion working in each such slot, the upper sides of said beam portion or portions forming a movable supporting surface moved between a position above and a position below said stationary surface when said structure is lowered and raised, hearth plates bridging each such slot which when said structure is lowered, are supported on said stationary surface and seal each such slot from the kiln chamber, and which are supported on said movable surface when said structure is raised, sealing means below said stationary surface preventing vertical flow through the joint space adjacent each side of the kiln between each beam portion side nearest thereto and the adjacent slot side, and kiln bottom heating means comprising a combustion chamber space formed in one or more of said portions between said joint spaces.

7. A combination as specified in claim 6, in which the combustion chamber space is open at its upper side so that the heating gases may contact the under sides of said hearth plates and in which the latter and the said movable surface in engagement with said plates when said structure is raised then provide seals interposed between the kiln chamber space and the combustion chamber space.

8. A combination as specified is claim 6, in which thin bodies of good heat conducting material form the top wall of the combustion space and form portions of one of the hearth plate supporting surfaces.

9. The combination in a continuous tunnel kiln having a horizontally elongated chamber through which goods are moved from the entrance end of said chamber to its exit end and having a bottom wall comprising longitudinally extending portions spaced away from another to form one or more longitudinally extending bottom wall slots, the upper sides of said portions providing a stationary supporting surface, of a vertically and longitudinally reciprocating goods advancing structure comprising a beam part working in each such slot, the upper side of each such beam part forming a movable supporting surface moved between a position above and a position below said stationary surface when said structure is lowered and raised, hearth plates bridging each such slot and supported on said stationary surface and sealing each such slot from the kiln chamber when said structure is lowered, and supported on said movable supporting surface when said structure is raised, sealing means below the said bottom wall portions which lie between the said joint space adjacent one side and the said joint space adjacent the other side of the kiln.

10. A continuous tunnel kiln, and a kiln bottom structure reciprocating both horizontally and vertically to move goods through the kiln chamber from the entrance end to the exit end thereof, said structure containing a combustion system comprising a combustion chamber, with air and fuel inlets thereto and an exhaust outlet, for heating the goods moved through the kiln chamber by said bottom structure, said combustion system being sealed from said kiln chamber at all times to prevent substantial ingress to said kiln chamber of gases from said combustion system and to prevent substantial egress of gases from said kiln chamber to said combustion system.

11. The combination in a contious tunnel kiln having a horizontally elongated chamber through which goods are moved from the entrance end of said chamber to its exit end and having a stationary goods supporting surface at the bottom of said chamber, of a goods moving and kiln bottom heating unit comprising a beam structure extending longitudinally of the kiln, and movable up and down to lift the goods off and return them into supporting relation with said surface, and movable longitudinally of the kiln chamber in one direction while elevated to support the goods, and in the opposie direction, while lowered to permit the goods to be supported by said surface, and formed with a combustion chamber in its upper portion sealed against communication with the kiln chamber and extending longitudinally of the latter, and fuel supply and waste heat off-take connections to portions of said combustion chamber respectively remote from and adjacent the entrance end of the kiln.

12. The combination in a continuous tunnel kiln having a horizontally elongated chamber through which goods are moved from the entrance end of said chamber to its exit end and having a stationary goods supporting surface at the bottom of said chamber, of a goods moving and kiln bottom heating unit comprising a beam structure extending longitudinally of the kiln, and movable up and down to lift the goods off and return them into supporting relation with said surface, and movable longitudinally of the kiln chamber in one direction while elevated to support the goods, and in the opposite direction, while lowered to permit the goods to be supported by said surface, and formed with a combustion chamber in its upper portion sealed against communication with the kiln chamber and extending longitudinally of the latter, fuel supply and waste heat off-take connections to portions of said combustion chamber respectively remote from and adjacent the entrance end of the kiln, and means for supplying cooling air to a portion of said combustion chamber intermediate the first mentioned portions.

13. The combination in a continuous tunnel kiln having a horizontally elongated chamber through which goods are moved from the entrance end of said chamber to its exit end and having a stationary goods supporting surface at the bottom of said chamber, of a goods moving and kiln bottom temperature modifying unit comprising a beam structure extending longitudinally of the kiln, and movable up and down to lift the goods off and return them into supporting relation with said surface, and movable longitudinally of the kiln chamber in one direction while elevated to support the goods, and in the opposite direction, while lowered to permit the goods to be supported by said surface, and formed with a flue in its upper portion sealed against communication with the kiln chamber and extending longitudinally of the latter and having an air inlet and a waste heat off-take connection to said flue adjacent the exit and entrance ends of the kiln, respectively, and means for supplying fuel to a portion of said flue intermediate the ends of the kiln to unite in combustion, in the portion of said flue intermediate said means and off-take connection, with air passing through the portion of said flue between said air inlet and means, and absorbing heat from the kiln chamber in so passing.

14. The combination in a continuous tunnel kiln having a horizontally elongated chamber through which goods are moved from the entrance end of said chamber to its exit end and having a stationary goods supporting surface at the bottom of said chamber, of a goods moving and kiln bottom heating unit comprising a beam structure extending longitudinally of the kiln, and movable up and down to lift the goods off and return them into supporting relation with said surface, and movable longitudinally of the kiln chamber in one direction while elevated to support the goods, and in the opposite direction, while lowered to permit the goods to be supported by said surface, and formed with a combustion chamber in its upper portion sealed against communication with the kiln chamber and extending longitudinally of the latter, fuel supply and waste heat off-take connections to portions of said combustion chamber respectively remote from and adjacent the entrance end of the kiln, and stationary fuel supply and waste heat off-take means to which said connections are flexibly connected.

15. The combination in a continuous tunnel kiln having a horizontally elongated chamber through which goods are moved from the entrance end of said chamber to its exit end and having a stationary goods supporting surface at the bottom of said chamber, of a goods moving and kiln bottom heating unit comprising a beam structure extending longitudinally of the kiln, and movable up and down to lift the goods off and return them into supporting relation with said surface, and movable longitudinally of the kiln chamber in one direction while elevated to support the goods, and in the opposite direction, while lowered to permit the goods to be supported by said surface, and formed with a combustion chamber in its upper portion sealed against communication with the kiln chamber and extending longitudinally of the latter, fuel supply and waste heat off-take connections to portions of said combustion chamber respectively remote from and adjacent the entrance end of the kiln, one of said connections comprising a vertical conduit portion carried by and depending from said beam structure, an uprising stationary conduit section, and means providing a liquid sealed telescopic joint between said portion and section with clearance to accommodate the movements relative to said section of said portion produced by the movements of said beam structure.

16. The combination in a continuous tunnel kiln having a horizontally elongated chamber through which goods are moved from the entrance end of said chamber to its exit end and having a stationary goods supporting surface at the bottom of said chamber, of a goods moving and kiln bottom heating unit comprising a beam structure extending longitudinally of the kiln, and movable up and down to lift the goods off and return them into supporting relation with said surface, and movable longitudinally of the kiln chamber in one direction while elevated to support the goods, and in the opposite direction, while lowered to permit the goods to be supported by said surface, and formed with a combustion chamber in its upper portion sealed against communication with the kiln chamber and extending longitudinally of the latter, and having one or more passages communicating with said combustion chamber and extending downwardly through the beam structure and a damper for each such passage at the under side of said beam structure, fuel supply and waste heat off-take connections to portions of said combustion chamber respectively remote from and adjacent the entrance end of the kiln, and means for supplying cooling air to a portion of said combustion chamber intermediate the first mentioned portions.

17. A continuous tunnel kiln having a kiln chamber and a kiln chamber bottom wall with two or more slots therein and a stationary wall portion between said slots, a vertically and longitudinally reciprocating goods advancing structure including a beam portion working in each such slot, and a kiln bottom heating unit comprising a combustion chamber formed in said wall portion and extending longitudinally of the kiln and sealed against communication with said kiln chamber, and means for supplying fuel and air to and withdrawing products of combustion from said combustion chamber.

18. A continuous tunnel kiln having a kiln chamber and a kiln chamber bottom wall with two or more slots therein and a stationary wall portion between said slots, a vertically and longitudinally reciprocating goods advancing structure including a beam portion working in each such slot, and a kiln bottom heating unit comprising a combustion chamber formed in said wall portion and extending longitudinally of the kiln and sealed against communication with the first mentioned chamber, and means for supplying fuel and air to and withdrawing products of combustion from said combustion chamber, said means comprising a plurality of ports opening to said combustion chamber through the bottom wall of the latter.

19. A continuous tunnel kiln having a kiln chamber and a kiln chamber bottom wall with two or more slots therein and a stationary wall portion between said slots, a vertically and longitudinally reciprocating goods advancing structure including a beam portion working in such slot, a kiln bottom heating unit comprising a combustion chamber formed in said wall portion adjacent its upper side and extending longitudinally of the kiln and sealed against communication with the first mentioned chamber and fuel supply and waste off-take connections to portions of said combustion chamber respectively remote from and adjacent the entrance end of the kiln, and means for supplying cooling air to a portion of said combustion chamber intermediate the first mentioned portions.

20. A continuous tunnnel kiln having a kiln chamber and a kiln chamber bottom wall with two or more slots therein and a stationary wall portion between said slots, a vertically and longitudinally reciprocating goods advancing structure including a beam portion working in such slot, and a kiln bottom heating unit comprising a combustion chamber formed in said wall portion adjacent its upper side and extending longitudinally of the kiln and sealed against communication with the first mentioned chamber and an air inlet and a waste off-take connection opening to portions of said combustion chamber respectively remote from and adjacent the entrance end of the kiln, and means for supplying fuel to a portion of said chamber intermediate the ends of the kiln to unite in combustion in the portion of said chamber intermediate said means and off-take connection with air passing through the portion of said flue between said air inlet and means, and absorbing heat from the kiln chamber in so passing.

CLIFFORD H. PARMELEE.